United States Patent Office 2,916,948
Patented Dec. 15, 1959

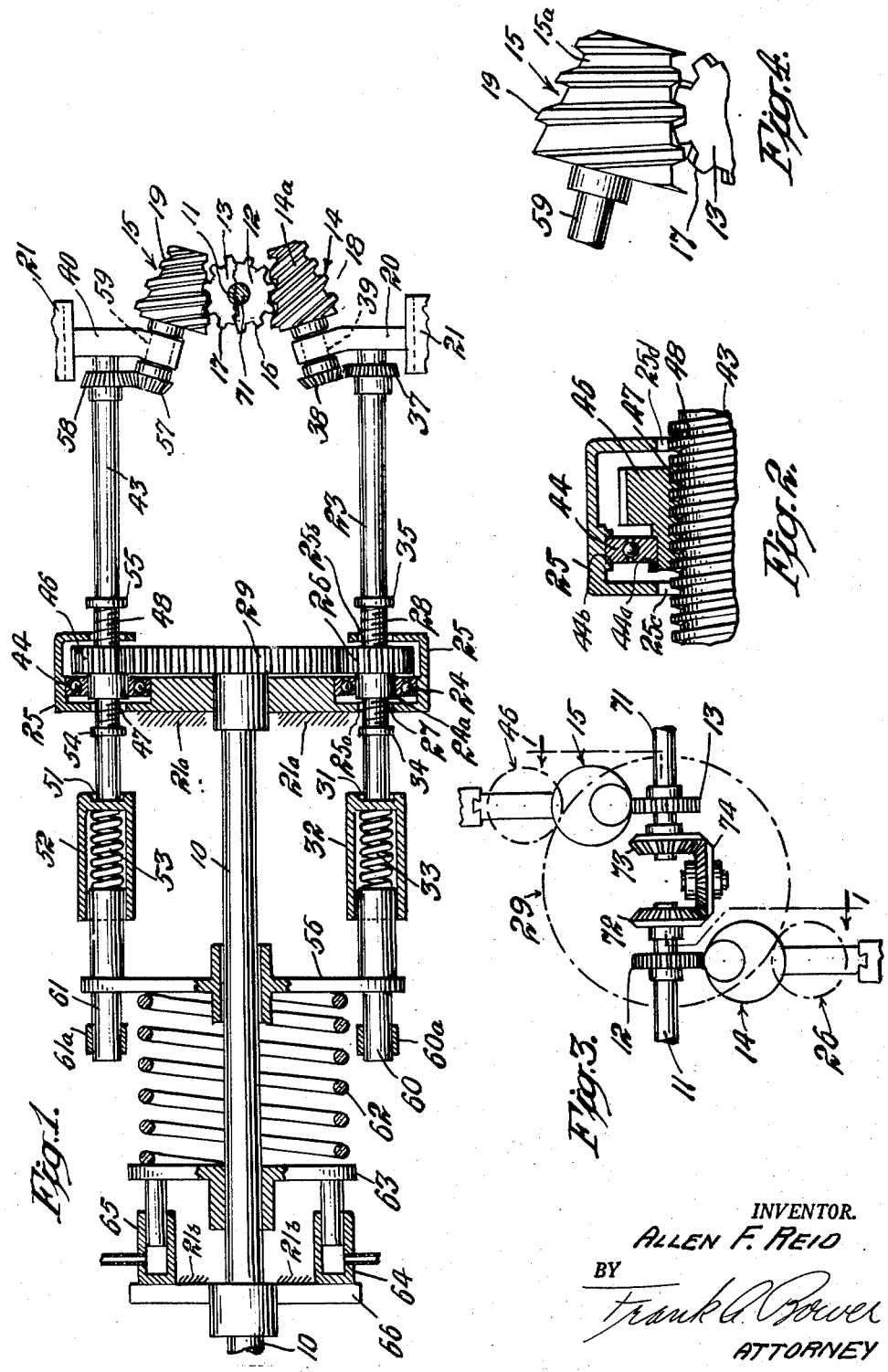

2,916,948

ROTARY POWER TRANSMISSION

Allen F. Reid, Dallas, Tex.

Application November 9, 1956, Serial No. 621,430

9 Claims. (Cl. 74—665)

This application relates to transmission systems and relates particularly to the continuously variable torque transmissions.

An object of this invention is to provide a transmission system in which the input and output shafts are mechanically coupled at all times, and the torque relationship between the input and output shafts is continuously variable.

Other and further objects in the invention will be apparent from the following description taken in connection with the drawings in which:

Fig. 1 is a schematic view of the transmission system with the coupling to the output shafts sectionally indicated along lines 1—1 of Fig. 3;

Fig. 2 is an enlarged sectional view of the stud gear and mounting and a detailed view of the threaded portion;

Fig. 3 is an end view of the transmission system showing the coupling between the output shaft and the transmission system; and Fig. 4 is a detailed view of the conical gear meshing with the output worm gear.

The input shaft 10 is connected to a prime mover, such as a gasoline engine, having a variable power and speed output. The output shafts 11 and 71 are subject to a variable load (not shown), such as the wheels of a vehicle. The transmission system connected between the shaft 10 and the output shafts 11 and 71 provides a means for varying the torque relationship between the output shafts 11 and 71 and the input shaft 10 so that as the load on shafts 11 and 71 increases, the mechanical advantage between the shaft 10 and the shafts 11 and 71 increases. The shaft 11 has two gears 12, 72. Gear 72 is a member of a gear chain 72, 73, 74 which transmits all torques and motion from shaft 71 to shaft 11 in an equal but rotationally opposite manner. Shaft 71 has two gears 13, 73. The gears 12 and 13 have teeth 16 and 17, respectively, for engaging the teeth 18 and 19 of the respective conical gears 14 and 15. In Fig. 4, a detailed view of the conical gear 15 and the gear 13 is shown. Fig. 3 illustrates an end view of the transmission system with the teeth of the conical gears 14 and 15 omitted for simplicity of illustration. The tooth 19 is formed continuously around the conical surface 15a. The circular pitch of the tooth at the small diameter end is smaller than the circular pitch of the tooth at the larger diameter end. Thus, the gear 13 engages teeth of increasing pitch diameter as the conical gear moves from engagement at the lesser diameter end to the greater diameter end. The circular pitch of the tooth 19 is such as to produce a constant advance parallel to the axis per unit of pitch circle. The bearing 40 is slidingly mounted on the fixed frame 21 so that the conical gear 15 moves tangential to the gear 13. The gears 13 and 15 thereby remain in mesh as the gear 15 is shifted in response to the torque changes. The tooth 19 is further formed so that the gear 13 is in mesh with the gear 15 for a complete rotation of the gear 15 about the axis of the shaft 59 when gear 15 is shifted to its left extreme limit.

In this embodiment the diameter of the conical gear at the larger end is twice the diameter at the smaller end and the circular pitch at the larger end is double the circular pitch at the smaller end. At the smaller end the gear 13 remains in engagement with the tooth 19 for a complete rotation of the conical gear 15. At the larger end, however, the pitch of the tooth 19 is double that of the teeth 17 on the gear 13. The teeth 17 are therefore in force transmitting relation with the tooth 19 for one half a rotation of the gear 15. In the intermediate positions, the gear 13 is engaged with the gear 15 between a one half and a full rotation of the gear 15.

The conical gear 14 is on the opposite side of the shafts 11 and 71 from gear 15 and functions in a similar manner to the gear 15. The gear 14 preferably engages the gear 12 at a point diametrically opposite to the engagement of the gear 13 by the conical gear 15. The diameter of the larger end of the conical gear 14 is twice that of the smaller end and the circular pitch of the tooth 18 at the larger end is twice that at the smaller end. When the gears 12 and 13 are engaged at the larger ends of gears 14 and 15, respectively, the gear 13 is in force transmitting engagement with the conical gear 15 on one half of the rotation and the gear 12 is in force transmitting engagement with the conical gear 14 on the other half of the rotation of shaft 11. At the smaller diameter ends, the gears 12 and 13 are continuously meshed in force transmitting relationship with the respective conical gears 14 and 15 for complete rotation of the shafts 39 and 59.

The conical gears 14 and 15 are shifted in relation to the gears 12 and 13 in response to variations in relationship of the torque between shaft 10 and shafts 11 and 71. By shifting the conical gears to mesh at the smaller diameter end, the mechanical advantage between the shafts 39 and 59 and the shaft 11 is increased. This reduces the torque requirement or the power output from the prime mover driving the shaft 10. The transmission mechanism for producing this shift is described later herein.

The conical gear 14 is mounted on a shaft 39 journaled in a bearing support 20 slidingly mounted on a fixed frame 21. The gear is driven by the prime mover through the shaft 10, drive gear 29, stud gear 26, shaft 23 and the beveled gears 37, 38. The shaft 23 is journaled at one end of bearing support 20 and supported intermediately by the stud gear 26 mounted in the bearing 24. The shaft 23 has a threaded portion 28 fitting in a complementary groove portion 27 of the stud gear 26. The shaft 23 moves axially through the stud gear 26 when an unbalance of the axial pressures or forces applied to the shaft 23 occurs. When the axial pressures or forces are balanced, the stud gear 26 drives shaft 23. When an unbalance of the pressures and forces occurs, the stud gear 26 continues to drive the shaft 23 and in addition to rotate relative to the shaft 23 to move it axially to rebalance the forces.

At the end of the shaft 23 opposite to the beveled gear 37, a shock absorber 32 is mounted on the relatively stationary plate 56. The shock absorber 32 has spring means such as the helical spring 33 pressing against the end of the shaft 23 to oppose the opposite axial pressure or force of the conical gear 14. The shock absorber 32 may have a cup-shaped member 31 for receiving the end of the shaft 23. The output shaft 11 applies a backpressure or torque to the shaft 23 by means of the conical gear 14, shaft 39 and bearing support 20. When the back pressure or torque of the shaft 11 is balanced by the pressure of the spring 33, the axial forces against the shaft 23 are balanced. However, if the back torque of shaft 11 either increases or decreases, an unbalance occurs and a shift in the position of the conical gear results. Thus, the gear 12 and the conical gear 14 transmit to the shaft 23 a rotational force opposing the driving force of the prime mover and an axial force applied longitudinally to the shaft 23. The axial force is independent of the rotational force and speed of the shaft and is dependent on and proportional to the load torque on the shaft 11.

The casing 25 is securely mounted to the frame 21 and has openings, 25a and 25b, for passing the threaded portion of the shaft 23. The bearing 24 snugly fits in a cup-shaped portion 24a to properly support the stud gear 26 and shaft 23. The longitudinal movement of the shaft 23 is limited by the collars 34 and 35 secured to the shaft 23 adjacent to the threaded portion 28. The collars 34 and 35 abut the casing 25, thereby limiting the movement of the conical gear 14 to the length of the conical surface 14a. Gear 15 is supported and rotated by the shaft 59 journaled in the bearing support 40 which is slidingly mounted on frame 21 so that the toothed surface of gear 15 moves tangentially to the gear 13. The shaft 43 is intermediately supported by the gear 46 and the bearing 44 in a manner similar to support of the shaft 23. The bearing 44 is securely mounted in the casing 25. The shaft 43 has a threaded portion 48 engaged with a complementary groove portion 47 of the gear 46. The threaded portion 48 extends through openings 25c and 25d in the casing 25. The shaft 43 is moved longitudinally in a manner similar to shaft 23 and collars 54 and 55 are provided to abut the casing 25 for limiting the longitudinal movement of the shaft. The bearing 44 is fitted in cup-shaped portions 44a and 44b to prevent longitudinal movement of the gear 46. The end of the shaft 43 sets in the cup-shaped portion 51 of the shock absorber 52 with a spring 53. The other end of the shaft is journaled in bearing support 40. The gear 46 engages the drive gear 29 to supply power to the gear 15. Through the shaft 43, beveled gears 57, 58 and the shaft 59, the shock absorber 52, spring 53 and the threaded and grooved portions 47, 48 respond in an identical fashion to the torque of shaft 71, as the similar components associated with the shaft 23 respond to the torque of shaft 11. The shock absorbers 32 and 52 may be of a conventional type to retard the response of the springs 33 and 53 to the various forces. The plate 56 on which the shock absorbers 32 and 52 are mounted may be slidingly mounted to move longitudinally to the shaft 11 to adjust the pressure of the springs in relation to the torque of the shafts 11 and 71. Studs 60 and 61 may be mounted in fixed sleeves 60a or 61a to slidingly support the plate 56 independently of the shaft 11. The plate 56 is held in position by a heavy helical spring 62 pressed against the plate 56 by a plate 63 which may be longitudinally adjusted to vary the compression of the spring and the position of the plate 56 by the hydraulic means 64, 65 fixed to the frame 21b through the plate 66. These hydraulic means may be manually controlled by the operator, such as the driver of an automobile, or by automatic means or a combination thereof. Response to changes in speed, changes in conditions of power demand or supply, may thus control the mechanical advantage between the drive shaft and the output shaft. These hydraulic means vary the compression of the springs 33 and 53 and thereby the relationship of the axial forces of the shafts 23 and 43.

The teeth 16 and 17 on the gears 12 and 13 are of the worm gear type. The conical gears 14 and 15 have a continuous tooth formed on the surface of a respective gear. This tooth has a constant advance parallel to the axis of the conical gear per unit of pitch circle. The worm gears engaging a respective tooth remain in contact with the teeth 18 and 19 respectively for a full rotation of the conical gears 14 and 15 at the small diameter end of the conical gear. One turn of the conical gear at the reduced end advances or rotates the worm gear through a given number of degrees. At the large end, the two teeth 18 and 19 have the same advance per unit of pitch circle as at the small end. This means that at a two to one ratio, the conical gears need only turn one-half a rotation to rotate or advance the worm gear through the same angle as a full rotation at the smaller end. Thus, after one-half a rotation the worm gear and the conical gear cease to transfer driving torque, since the conical gear has advanced the worm gear the given amount. For the remaining one-half of the rotation of the conical gear, the conical gear and the worm gear are in mesh but not in force transmitting relationship. The worm gear is rotated by means of the shaft 11 which is being turned by means of the other conical-worm combination. The transmission system urges the conical gear, not in force transmitting relationship, to the higher torque ratio. The shock absorber prevents a rapid movement of the conical gear 15, so that the shift is slow. On reengagement of the worm and the conical gears, the torque of the shaft 11, if it is constant, will tend to shift the conical gear back to its original transverse position. Thus, with each rotation there is a corrective action so that on a change of torque there is an immediate response upon the part of the transmission system. Since the peripheral speed of the conical gear at the larger end is twice the speed at the smaller end, the turns of the tooth on the conical gear are spaced further apart at the larger end than at the smaller end. Various modifications and changes may be made in the invention without departing from the scope of the invention as set forth in the appended claims.

I claim:

1. A rotary power transmission for variable torques between a pair of shafts and a single shaft and comprising a pair of worm gears one on each of said pair of shafts, a pair of conical gears adapted to move tangentially to said worm gears in turning engagement therewith, each conical gear having a tooth of constant advance per unit of pitch circle distance parallel to the axis of said conical gear, means for independently connecting each respective conical gear to said single shaft and means independently shifting each of said conical gears tangentially to its respective worm gear in response to the torque applied by a respective worm gear.

2. A rotary power transmission as set forth in claim 1 wherein said teeth of said conical gears have increasing circular pitch with increasing diameter and said gears are relatively meshed so that at least one of said worm gears is in force transmitting relationship with a respective conical gear.

3. A rotary power transmission as set forth in claim 2 wherein said worm gears are in force transmitting relationship with said conical gears for at least one half of a rotation of a respective conical gear.

4. A rotary power transmission as set forth in claim 1 wherein said connecting means has resilient means opposing the longitudinal force of said respective conical gear to hold said conical gears at the longitudinal position to provide the desired mechanical advantage.

5. A rotary power transmission as set forth in claim 4 wherein said connecting means has a rotatable connecting shaft coupled between said conical gears and said drive shaft for transmitting rotating power and said resilient means applies an axial force to said rotatable connecting shaft to balance said longitudinal force.

6. A rotary power transmission as set forth in claim 5 wherein separate shifting means are provided connected to each of said rotatable shafts for axially moving each of said shafts and to move a respective rotatable shaft and conical gear in response to the unbalance of said longitudinal force and said axial force.

7. A rotary power transmission as set forth in claim 6 wherein each of said shifting means comprises a threaded portion and an axially stationary portion having groove means engaging said threaded portion to rotate said shaft relative to said axially stationary portion to axially shift said rotatable shaft.

8. A rotary power transmission as set forth in claim 7 wherein said single shaft has a gear mounted thereon and rotated by said single shaft and each of said connecting means has a stud gear mounted on a respective rotatable shaft and connected to said axially stationary means to rotate said shaft therethrough.

9. A rotary power transmission as set forth in claim 4 wherein said resilient means comprise spring means engaging a respective connecting means, each of said spring means being mounted on a plate longitudinally adjustable for varying the relationship of the force applied by said resilient means and said worm gears.

References Cited in the file of this patent
UNITED STATES PATENTS

| | | |
|---|---|---|
| 756,634 | Fisher | May 3, 1904 |
| 1,462,316 | Alquist | July 17, 1923 |

UNITED STATES PATENT OFFICE
CERTIFICATE OF CORRECTION

Patent No. 2,916,948                      December 15, 1959

Allen F. Reid

It is hereby certified that error appears in the printed specification of the above numbered patent requiring correction and that the said Letters Patent should read as corrected below.

Column 6, line 9, list of references cited, under the heading, UNITED STATES PATENTS, for the patent number "756,634" read -- 758,634 --.

Signed and sealed this 31st day of May 1960.

(SEAL)
Attest:

KARL H. AXLINE
Attesting Officer

ROBERT C. WATSON
Commissioner of Patents